(12) United States Patent
Chaumont

(10) Patent No.: US 11,023,695 B2
(45) Date of Patent: Jun. 1, 2021

(54) SYSTEM AND METHOD FOR DETERMINING A SKEW LEVEL

(71) Applicant: C Series Aircraft Limited Partnership, Quebec (CA)

(72) Inventor: Carl Chaumont, Quebec (CA)

(73) Assignee: Airbus Canada Limited Partnership, Mirabel (CA)

( * ) Notice: Subject to any disclaimer, the term of this patent is extended or adjusted under 35 U.S.C. 154(b) by 84 days.

(21) Appl. No.: 16/423,891

(22) Filed: May 28, 2019

(65) Prior Publication Data
US 2020/0380222 A1    Dec. 3, 2020

(51) Int. Cl.
*G06K 7/10*    (2006.01)
*G06K 19/07*    (2006.01)

(52) U.S. Cl.
CPC ..... *G06K 7/10475* (2013.01); *G06K 19/0723* (2013.01)

(58) Field of Classification Search
CPC ............. G06K 7/00; G06K 7/08; G06K 7/081
USPC ................................ 235/451, 439, 435, 375
See application file for complete search history.

(56) References Cited

U.S. PATENT DOCUMENTS

| | | | |
|---|---|---|---|
| 2006/0044146 A1* | 3/2006 | Ferguson | G07C 5/008 340/679 |
| 2006/0124738 A1* | 6/2006 | Wang | G06K 7/10079 235/385 |
| 2008/0018489 A1* | 1/2008 | Kruest | G06K 7/10475 340/4.2 |
| 2009/0012882 A1* | 1/2009 | Sarangapani | G06Q 10/087 705/28 |
| 2013/0126670 A1 | 5/2013 | Vaghela | |
| 2016/0114904 A1 | 4/2016 | Neb et al. | |
| 2018/0111697 A1 | 4/2018 | Jones | |
| 2018/0281987 A1 | 10/2018 | Nelson et al. | |
| 2018/0284259 A1 | 10/2018 | Ankney et al. | |
| 2019/0002121 A1* | 1/2019 | Young | B64C 9/22 |

FOREIGN PATENT DOCUMENTS

EP        0922633 A2    6/1999

\* cited by examiner

*Primary Examiner* — Edwyn Labaze
(74) *Attorney, Agent, or Firm* — Greer, Burns & Crain, Ltd.

(57) ABSTRACT

A system and method for determining a skew level of a movable control surface in an aircraft. A position of an inboard and outboard side of the movable control surface are determined by RFID readers and RFID tags. As the tags move past the readers, the positioning of each side of the movable control surface may be compared to determine the skew level. Actions can be taken if the skew level exceeds predetermined threshold values.

14 Claims, 4 Drawing Sheets

SYSTEM AND METHOD FOR DETERMINING A SKEW LEVEL

FIELD OF THE INVENTION

This application relates generally to aircraft controls, and more particularly to apparatuses and processes for determining a skew level of a movable control surface of an aircraft.

BACKGROUND OF THE INVENTION

Aircraft are provided with numerous movable components, or control surfaces, which are used to control, for example, the speed, attitude, and/or direction of the aircraft. Such control surfaces include, for example, ailerons, rudders, elevators, leading-edge slats, trailing edge flaps and the like. Certain control surfaces are rotatable along an axis of rotation, thus adjusting their angle relative to the aircraft. Other control surfaces move slidably along tracks or other mechanisms, which may be used to adjust both the angle and the position of the control surface relative to the aircraft.

The control surfaces are typically moved by multiple actuators or other types of motors. If the actuators are not properly synchronized, movement of the control surfaces can be irregular. Additionally, if some of the actuators malfunction, fail, or become disconnected from the control surface to which they are associated, this can also lead to improper movement of the control surfaces. The irregular movement can result in surface asymmetry, skew, or other improper movement of the affected control surfaces which can cause control issues for the aircraft, premature wear of parts of the control surfaces, increase of fuel consumption due to the additional drag and performance decrease.

Recently, a solution has been proposed which uses proximity sensors that move, with the surface, along a track. A sensor is positioned at inboard and outboard sides of the surface. Along each of the tracks, various cutouts in a metal strip are present and are used to determine the position of each sensor. The inboard and outboard positions are compared to determine a skew level. This system is described in more detail in US 2019/0002121, the entirety of which is incorporated herein by reference.

While presumably effective for its intended purpose, it would be desirable to provide a system that determines a more accurate position of the inboard and outboard sides of the control surface to provide a more accurate determination of the position of the control surface.

SUMMARY OF THE INVENTION

A new system and process for determining the position of a movable control surface have been invented. According to the invented embodiments, each of the inboard and outboard sides of the movable control surface are associated with a plurality of RFID tags. Each RFID tag is correlated to a specific position of the movable control surface. An RFID reader is moved relative to the RFID tags. The RFID reader determines a position of the respective side of the control surface based on the most recently read RFID tag. Compared with the proximity sensors and metal strip, discussed above, the RFID tags provide a much smaller surface area—allowing a more precise position to be determined. Additionally, the use of the RFID tags reduces the weight of the system as it alleviates the need for the metal strip.

Therefore, in a first embodiment of the invention, the present invention may be characterized broadly as providing a method for detecting skew in a movable control surface of an aircraft by: moving a first plurality of RFID tags relative to a first RFID reader, wherein each RFID tag from the first plurality of RFID tags is associated with a pre-determined position of an inboard side of the movable control surface; detecting each RFID tag as each RFID tag passes the first RFID reader; determining a position of the inboard side of the movable control surface based on a most recently detected RFID tag from the first plurality of RFID tags; moving a second plurality of RFID tags relative to a second RFID reader, wherein each RFID tag from the second plurality of RFID tags is associated with a pre-determined position of an outboard side of the movable control surface; detecting each RFID tag as each RFID tag passes the second RFID reader; determining a position of the outboard side of the movable control surface based on a most recently detected RFID tag from the second plurality of RFID tags; and, comparing the position of the inboard side of the movable control surface to the position of the outboard side of the movable control surface to determine a skew level.

The first plurality of RFID tags may be moved, and the first RFID reader may be stationary, relative to the first plurality of RFID tags. Alternatively, the first RFID reader may be moved, and the first plurality of RFID tags may be stationary, relative to the first RFID reader.

The method may also include comparing the detected RFID tag from the first plurality of RFID tags with a database comprising each RFID tag and the pre-determined position of that RFID tag. The method may further include comparing the detected RFID tag from the second plurality of RFID tags with a database comprising each RFID tag and the pre-determined position of that RFID tag.

Each RFID tag in the first plurality may be programmed with the pre-determined position of that RFID tag. Each RFID tag in the second plurality may be programmed with the pre-determined position of that RFID tag.

The method may further include comparing the skew level to a first skew threshold and, when the skew level is beyond the first skew threshold, raising an alert associated with the first skew threshold. The method may also further include comparing the skew level to a second skew threshold and, when the skew level is beyond the second skew threshold, inhibiting movement of the movable control surface.

According to a second aspect, the present invention may also be characterized as generally providing a method for determining a position of a movable control surface of an aircraft by: moving a first plurality of RFID tags relative to a first RFID reader, wherein each RFID tag from the first plurality of RFID tags is associated with a pre-determined position of the movable control surface; detecting each RFID tag from the first plurality of RFID tags as the RFID tags pass the first RFID reader; and, comparing the detected RFID tag from the first plurality of RFID tags with a database comprising each RFID tag and the pre-determined position of that RFID tag.

The method may also include: moving a second plurality of RFID tags relative to a second RFID reader, wherein each RFID tag from the first plurality of RFID tags is associated with a pre-determined position of the movable control surface; detecting each RFID tag from the second plurality of RFID tags as the RFID tags pass through a zone of detection for the second RFID reader; and, comparing the detected RFID tag from the second plurality of RFID tags with the database comprising each RFID tag and the pre-determined position of that RFID tag. Additionally, the first plurality of RFID tags may be moved, and the first RFID reader may be stationary, relative to the first plurality of RFID tags. Alternatively, the first RFID reader may be moved, and the first plurality of RFID tags may be stationary, relative to the first RFID reader.

According to a third aspect, the present invention may also be broadly characterized as providing a system for detecting skew in a movable control surface of an aircraft which includes: a controller; a first plurality of RFID tags arranged on one of an inboard and outboard side of the movable control surface, and each RFID tag from the first plurality of RFID tags associated with a pre-determined position of the movable control surface; a second plurality of RFID tags arranged on the other of the inboard and outboard side of the movable control surface, and each RFID tag from the second plurality of RFID tags associated with a pre-determined position of the movable control surface; a first RFID reader in communication with the controller and configured to be moved relative to the RFID tags from the first plurality of RFID tags; and, a second RFID reader in communication with the controller and configured to be moved relative to the RFID tags from the second plurality of RFID tags.

The controller may be configured to determine a skew level of the movable control surface by: receiving a first signal from the first RFID reader relating to a most recently read RFID tag from the first plurality of RFID tags; receiving a second signal from the second RFID reader relating to a most recently read RFID tag from the second plurality of RFID tags; determining a position of an inboard side of the movable control surface based on the first signal; determining a position of an outboard side of the movable control surface based on the second signal; and, comparing the position of the inboard side of the movable control surface to the position of the outboard side of the movable control surface to determine a skew level.

The first and second signals may correspond to an identity of the detected RFID tags, and the controller may be further configured to: compare the first signal with a database comprising each RFID tag and the pre-determined position of that RFID tag; and, compare the second signal with the database comprising each RFID tag and the pre-determined position of that RFID tag.

The first signal may include a position of the detected RFID tag from the first plurality of RFID tags and the second signal may include a position of the detected RFID tag from the second plurality of RFID tags.

The controller may be configured to compare the skew level to a first skew threshold and, when the skew level is beyond the first skew threshold, raise an alert associated with the first skew threshold. The controller may also compare the skew level to a second skew threshold and, when the skew level is beyond the second skew threshold, inhibit movement of the movable control surface.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, new systems and processes have been invented for determining the position of a movable control surface with an RFID reader and RFID tags. With these general principles in mind, one or more embodiments of the present invention will be described with the understanding that the following description is not intended to be limiting.

Figure 1:
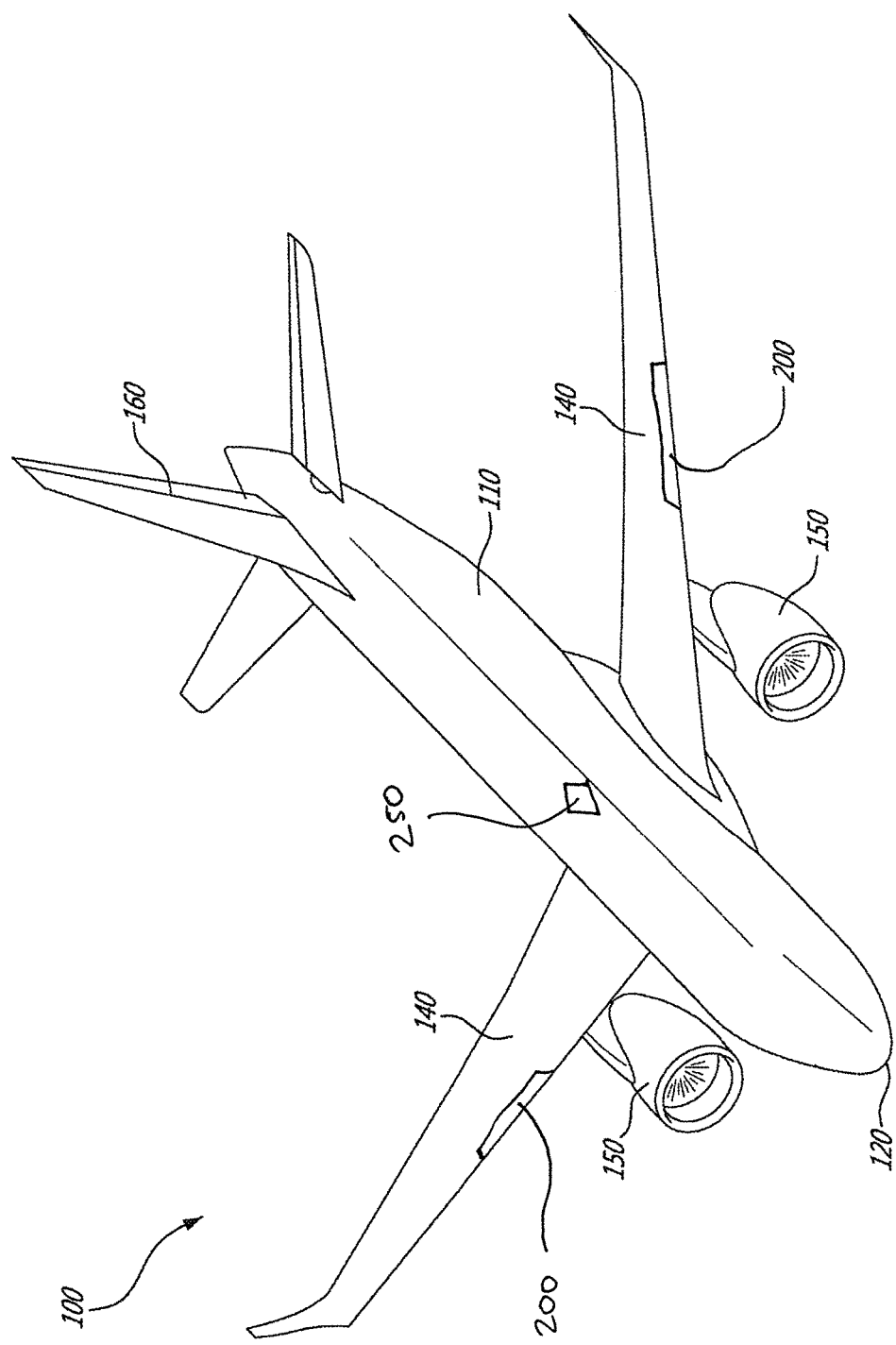
FIG. 1 shows a front and side perspective view of an aircraft that may utilized in accordance with the present invention.

As shown in FIG. 1, an aircraft 100, having a fuselage 110, is equipped with a pair of wings 140, engines 150, and a tail 160. The aircraft 100 can be any type of aircraft, including propeller planes, jet planes, turbojet planes, turbopropeller planes, turboshaft planes, gliders, and the like. The fuselage 110 has a cockpit 120, which may be positioned at any suitable location on the aircraft 100, for example at a front portion of the fuselage 110. The cockpit 120 is configured for accommodating one or more pilots who control the aircraft 100 by way of one or more operator controls (not illustrated). The operator controls may include any suitable number of pedals, yokes, steering wheels, center sticks, flight sticks, levers, knobs, switches, and the like.

The fuselage 110 may be a composite fuselage, a metallic fuselage, or may use any other suitable material. For example, the fuselage 110 is made from one or more composite materials, including fiberglass, carbon fiber, polymers, and the like. In certain embodiments, the fuselage 110 is made of a plurality of layers of composite materials. In another example, the fuselage 110 is made from one or more metallic materials, including aluminum, steel, titanium, and the like. In a further example, the fuselage combines composite materials, metallic materials, and any other suitable material, including wood, fabric, etc. The wings 140 and the tail 160 can also be made of any one or more suitable materials, which may be the same material(s) as used for the fuselage 110, or may be a different material or composition of materials.

In addition, the wings 140 are equipped with a plurality of control surfaces including wing slats 200. The slats 200 are control surfaces which alter the lift augmentation of the wings 140 of the aircraft 100. In particular, the slats 200 are configured for being positioned in a retracted mode, for example during many flight phases, and a deployed mode, where altered wing aerodynamic characteristics are provided, for example during take-off and landing. In some embodiments, the slats 200 are configured to be deployed or retracted along a spectrum between a fully-deployed position and a fully-retracted position. The wings 140 may also be equipped with other control surfaces, for example flaps, and the like. Although FIG. 1 depicts leading-edge slats 200, it should be appreciated that the description may be applied to any other control surfaces and flight components generally, including the flaps.

As is known, by moving the slats 200, the wing aerodynamic characteristics of the aircraft 100 can be adjusted for various flight requirements for the aircraft 100. For example, when the slats 200 are deployed, the aircraft 100 is able to fly at lower speeds and perform take-off or landing in shorter distances. In another example, slats 200 are deployed during take-off and landing maneuvers. However, during other flight phases, the slats 200 are typically retracted to minimize drag.

Figure 2:
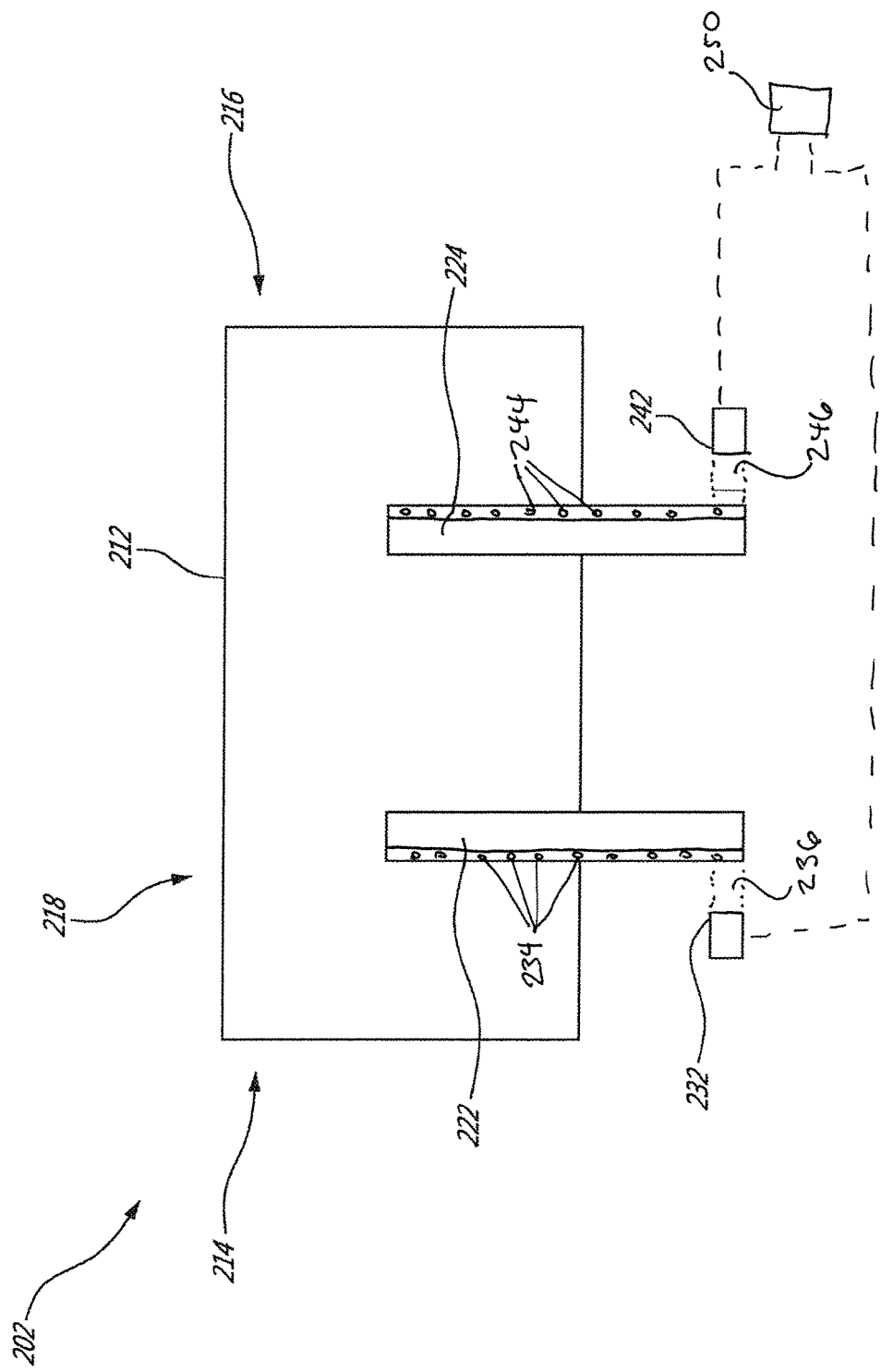
FIG. 2 shows a schematic view of a wing slat in an aircraft that may utilized in accordance with the present invention.

With reference to FIG. 2, the slats 200 are composed of one or more slat assemblies 202, an example of which is shown. The slat assembly 202 is made up of a slat panel 212 and a pair of tracks 222, 224. The slat panel 212 and the tracks 222, 224, are configured for being mated in order to direct the movement of the slat panel 212 along the tracks 222, 224, for example to allow the slat panel to transition between the deployed and retracted positions. Although the embodiment shown in FIG. 2 includes two tracks 222, 224, any suitable number of tracks may be used to guide the motion of the slat panel 212.

The slat panel 212 has first and second sides 214, 216 and a front end 218, and may be made of any suitably rigid material. For example, the slat panel 212 is made of any one or more composite materials, including fiberglass, carbon fiber, polymers, and the like, or any suitable metal, for example titanium, aluminum, and the like. The slat panel 212 has defined therein one or more suitable attachment features for mating with the tracks 222, 224, which is discussed in greater detail below. The number of attachments may be two, three, four, or any other suitable number, and varies to match the number of tracks. Additionally, depending on the position of the slat 200 in the aircraft 100, either side 214, 216 can be the inboard side with the other being the outboard side.

Although the slat panel 212 is illustrated as having a rectangular shape, it should be noted that this is for ease of illustration. The slat panel 212 may take on any suitable shape, size, thickness, orientation, and the like, as is conducive to adjusting the wing lift of the aircraft 100.

The tracks 222, 224 serve to guide the movement of the slat panel 212, thereby allowing the slat assembly 202 to move between retracted and deployed positions. In some embodiments, the tracks 222, 224 include attachment features which are configured for mating with complementary attachment features located on a surface of the slat panel 212. For example, the recesses in the slat panel 212 are fitted with bearings to facilitate the displacement of the slat panel 212 via projections along the tracks 222, 224. In other embodiments, the tracks 222, 224 are configured for being slidably inserted into bores located within the slat panel 212. Still other embodiments of the tracks 222, 224 are considered.

The slat panel 212 moves along, or together with, the tracks 222, 224 via the action of one or more motors, which drive one or more actuators (neither shown). The actuators may act on the slat panel 212 itself, on the tracks 222, 224, or on both the slat panel 212 and the tracks 222, 224. Any suitable type of actuator may be used, including electrical actuators, hydraulic actuators, rotary geared actuators, and the like. In some embodiments, the actuators are located in or otherwise attached to the slat panel 212. In other embodiments, the actuators are located within the wings 140 and are coupled to the slat panel 212 and/or the tracks 222, 224 in any suitable fashion. In still further embodiments, the actuators are located in the fuselage 110 of the aircraft 100.

Figure 3:
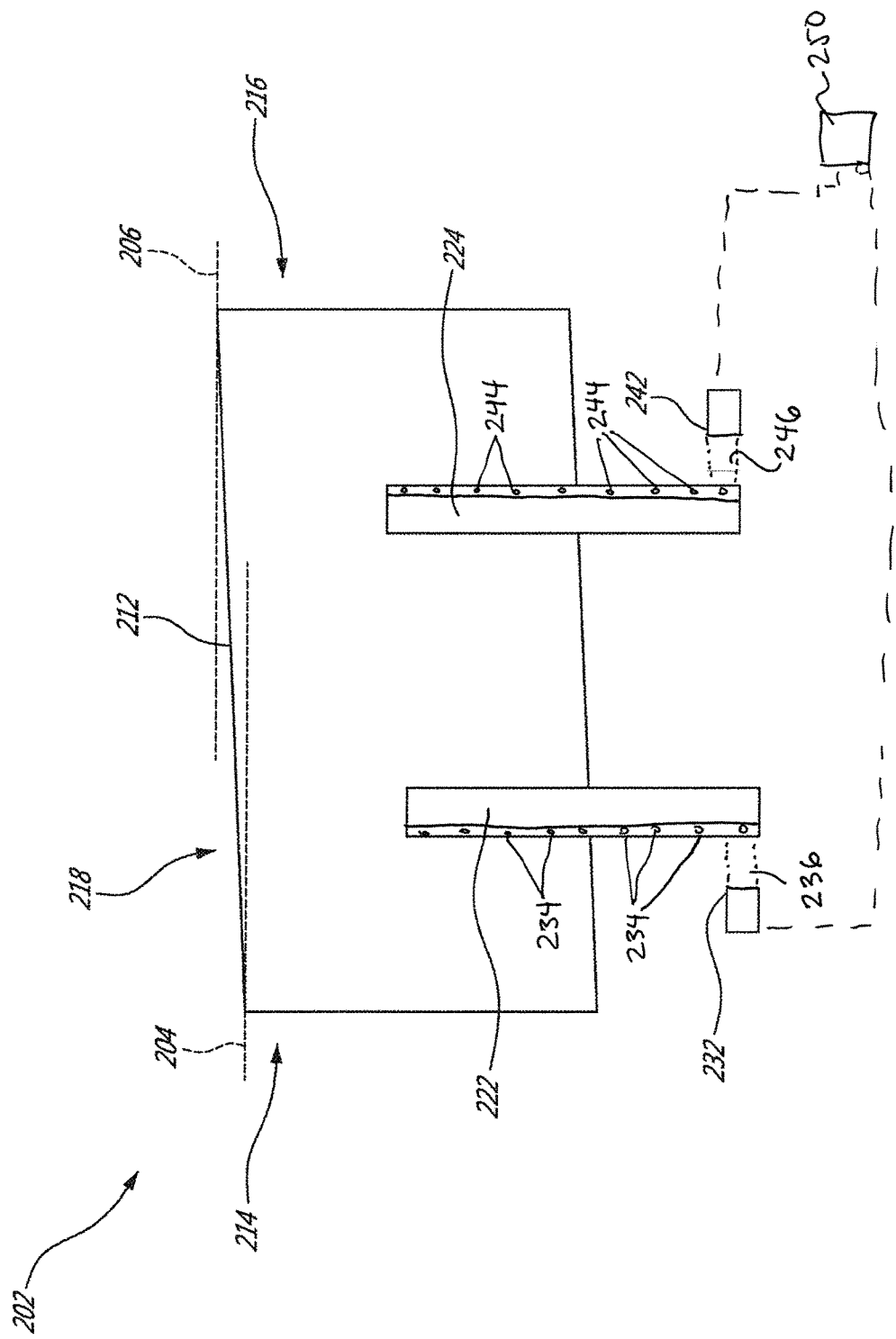
FIG. 3 shows a schematic view of the wing slat of FIG. 2 in which the wing slat has a skew; and, FIG. 4 shows a process flow diagram of a process according to or more aspects of the present invention.

As shown in FIG. 3, if the actuators are not properly synchronized, if one or more of the actuators fails or malfunctions, or if there is any failure in the drive mechanism between the actuator and the slat panel 212, the slat panel 212 may move asymmetrically, thereby developing skew. For example, an actuator may jam, or become disconnected from the slat panel 212, thereby causing asymmetric movement of the slat panel 212. In some embodiments, the disconnection of the actuator may in turn cause a jam.

Generally, the slat panel 212, or the slat assembly 202 as a whole, is considered to be skewed when a portion of the front end 218 near the first side 214 is not aligned with a portion of the front end 218 near the second side 216, and vice-versa. In FIG. 3, the portion of the front end 218 near the first side 214 defines a plane 204, and the portion of the front end 218 near the second side 216 defines a plane 206. Since the planes 204, 206 are not aligned, the slat panel 212 is said to be skewed.

In order to detect the development of skew in the slat panel 212, the slat assembly 202 is equipped with one or more RFID readers 232, 242. While, in the depicted embodiment, only one RFID reader 232, 242 is shown for each side 214, 216 of the slat panel 212, it is contemplated that two RFID readers 232, 242 are used on each side 214, 216 to provide for improved accuracy and redundancy. Further, it is contemplated that a single RFID reader 232, 242 could be utilized merely to determine position of the slat 200. The RFID readers 232, 242 can be for a Passive Reader Active Tag system, an Active Reader Passive Tag system, or an Active Reader Active Tag system.

The RFID readers 232, 242 are configured for detecting RFID tags 234, 244 that are arranged to pass through a zone of detection 236, 246 for the RFID readers 232, 242. The RFID tags 234, 244 may be passive, active, or battery-assisted passive. The RFID tags 234, 244 are arranged into various pluralities—one for each RFID reader 232, 242. Thus, for the depicted embodiment, a first plurality includes first RFID tags 234 for the first RFID reader 232, and a second plurality includes second RFID tags 244 for the second RFID reader 242. Each RFID tag 234, 244 is associated with its specific position on the slat panel 212, so that the position of the slat panel 212 can be determined based on the most recently read RFID tag 234, 244.

As shown, the RFID tags 234, 244 may be located on tracks 222, 224. Additionally, the RFID tags 234, 244 may be coated with or embedded in epoxy or other material to ensure proper adhesion and protect the RFID tags 234, 244 from water, wind, debris, etc. Moreover, although depicted as RFID tags 234, 244 being moved relative to the RFID readers 232, 242, it is contemplated that the RFID readers 232, 242 could be mounted on the tracks 222, 224 or on the slat panel 212 and moved while the RFID tags 234, 244 are held stationary. Either configuration may be moved provided that the RFID tags 234, 244 and the RFID readers 232, 242 are moved relative to each other.

The RFID readers 232, 242 are in communication with a controller 250. The controller 250 may be a computing device comprising a processing unit and a memory which has stored therein computer-executable instructions. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may comprise any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

Thus, as the RFID tags 234, 244 are moved through the zones of detection 236, 246, the RFID readers 232, 242 transmit a signal to the controller 250. In some embodiments, each RFID tag 234, 244 is programmed to include its position. Thus, the signal sent from the RFID readers 232, 242 to the controller 250 will provide the position of the mostly recently read RFID tags 234, 244 (and thus the position of that side of the slat panel 212) to the controller. Alternatively, in some embodiments, the signal sent from the RFID readers 232, 242 to the controller 250 may merely be indicative of the most recent RFID tags 234, 244 to be read or detected by each of the RFID readers 232, 242. Accordingly, the controller 250 can compare the read RFID tag 234, 244 with a database that includes a position associated with each RFID tag 234, 244. By locating the appropriate RFID tag 234, 2344 in the database, the position of that RFID tag 234, 244 (and thus the position of that side of the slat panel 212) is determined.

By comparing the positions of the two sides 214, 216 of the slat panel 212, a skew level of the slat panel 212 can be determined. In some embodiments, the skew level is a binary value, either "skewed" or "not skewed", for example based on a particular threshold. In other embodiments, the skew level is expressed as an angle of the slat panel 212 relative to a reference axis. These are merely exemplary.

Additionally, it is contemplated that the skew level is compared to one or more skew thresholds. When the skew level of a slat panel 212 exceeds a first example skew threshold, an alert may be raised or a message may be sent to a crew of the aircraft, for example to warn the crew about the skew condition. If the skew level of the slat panel 212 is beyond a second example skew threshold, the controller may be configured for inhibiting movement of the slat panel 212 and/or of the slats 200 generally, to avoid further exacerbating the skew level. Any suitable number of skew thresholds may be provided, each having a different degree of severity and an associated response based on the severity.

Figure 4:
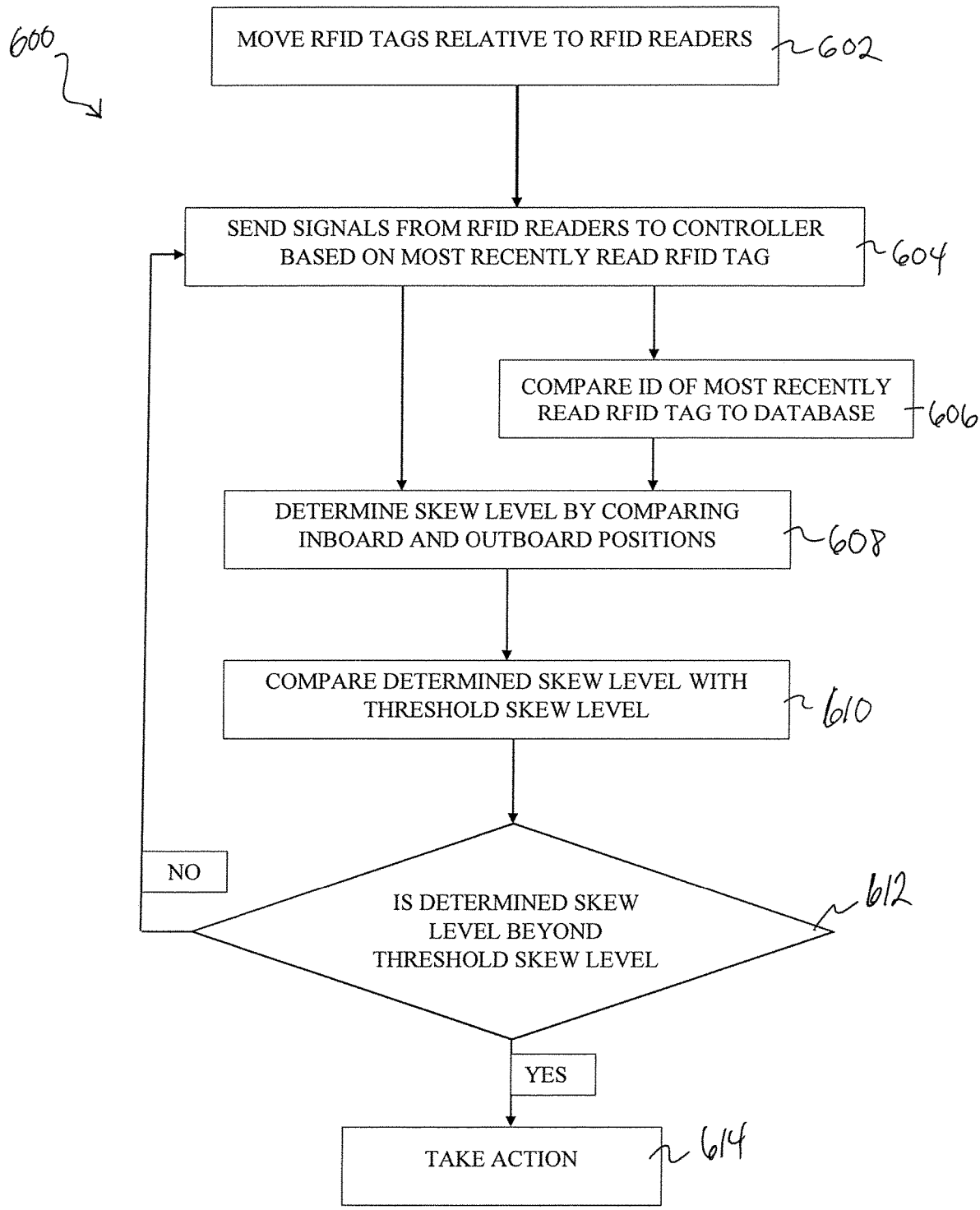

Turning to FIG. 4, an exemplary process 600 is shown. In a first step 602, the first and second pluralities of the RFID tags 234, 244 are moved past the first and second RFID readers 232, 242, respectively. Generally, as is known, as an RFID tag 234, 244 is moved through the zone of detection 236, 246 for the RFID reader 232, 242, the RFID reader 232, 242 is able to detect the RFID tag 234, 244.

Accordingly, in step 604, a signal is sent from each of the RFID readers 232, 242 to the controller 250. As noted above, in some embodiments each RFID tag 234, 244 is programmed with its position. Accordingly, the signal to the controller 250 may be the position of the detected RFID tag 234, 244 and the process 600 proceeds to step 606.

However, in some embodiments, the signal may only specify the identity of the RFID tag 234, 244. Accordingly, the process 600 proceeds to step 606, in which the controller 250 compares the identity of the RFID tag 234, 244 with a database correlating each of the RFID tags 234, 244 with its pre-determined position. Once the read RFID tags 234, 244 have been located in the database, and the controller 250 has the position of the read RFID tags 234, 244, the process proceeds to step 608.

In step 608, the positions of the two sides 214, 216 of the slat panel 212, based on the positions of the detected the RFID tags 234, 244, are compared to determine a skew level of the slat panel 212.

In the next step 610 of the process 600, the determined skew level is compared against a threshold skew level.

Subsequently, in step 612, if the controller determines that the determined skew level is below the threshold value, the process can return to step 604. If however, the controller 250 determines that the determined skew level is above the threshold skew level, the process 600 proceeds to step 614 which may include the controller 250 being programmed to take an action (cause an action to be taken by another controller or device), such as providing an indication of the skew level, like a warning, or inhibiting further movement of the slat panel 212.

The methods and systems described herein may be implemented in a high-level procedural or object-oriented programming or scripting language, or a combination thereof, to communicate with or assist in the operation of a computer system, for example the computing device. Alternatively, the methods and systems described herein may be implemented in assembly or machine language. The language may be a compiled or interpreted language. Program code for implementing the methods and systems for detecting skew in a wing slat of an aircraft described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting skew in a wing slat of an aircraft described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Compared with other systems and processes, the RFID reader and tag provide weight savings which, for an aircraft with many moveable slats, provides a consideration weight savings. Additionally, the present systems and processes are believed to provide for a more precise positioning determination since the RFID tags can be made small, thus allowing more of the tags to be used.

It should be appreciated and understood by those of ordinary skill in the art that various other components were not shown in the drawings as it is believed that the specifics of same are well within the knowledge of those of ordinary skill in the art and a description of same is not necessary for practicing or understanding the embodiments of the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for detecting skew in a movable control surface of an aircraft, the method comprising:
   moving a first plurality of RFID tags relative to a first RFID reader, wherein each RFID tag from the first plurality of RFID tags is associated with a pre-determined position of an inboard side of the movable control surface;
   detecting each RFID tag as each RFID tag passes the first RFID reader;
   determining a position of the inboard side of the movable control surface based on a most recently detected RFID tag from the first plurality of RFID tags;
   moving a second plurality of RFID tags relative to a second RFID reader, wherein each RFID tag from the second plurality of RFID tags is associated with a pre-determined position of an outboard side of the movable control surface;
   detecting each RFID tag as each RFID tag passes the second RFID reader;
   determining a position of the outboard side of the movable control surface based on a most recently detected RFID tag from the second plurality of RFID tags; and,
   comparing the position of the inboard side of the movable control surface to the position of the outboard side of the movable control surface to determine a skew level.

2. The method of claim 1, wherein the first plurality of RFID tags are moved and wherein the first RFID reader is stationary, relative to the first plurality of RFID tags.

3. The method of claim 1, wherein the first RFID reader is moved and wherein the first plurality of RFID tags are stationary, relative to the first RFID reader.

4. The method of claim 1, further comprising:
   comparing the detected RFID tag from the first plurality of RFID tags with a database comprising each RFID tag and the pre-determined position of that RFID tag.

5. The method of claim 4, further comprising:
   comparing the detected RFID tag from the second plurality of RFID tags with a database comprising each RFID tag and the pre-determined position of that RFID tag.

6. The method of claim 1, wherein each RFID tag in the first plurality is programmed with the pre-determined position of that RFID tag.

7. The method of claim 6, wherein each RFID tag in the second plurality is programmed with the pre-determined position of that RFID tag.

8. The method of claim 1, further comprising:
   comparing the skew level to a first skew threshold; and
   when the skew level is beyond the first skew threshold, raising an alert associated with the first skew threshold.

9. The method of claim 8, further comprising:
   comparing the skew level to a second skew threshold; and
   when the skew level is beyond the second skew threshold, inhibiting movement of the movable control surface.

10. A system for detecting skew in a movable control surface of an aircraft, comprising:
    a controller configured to determine a skew level of the movable control surface by:
      receiving a first signal from the first RFID reader relating to a most recently read RFID tag from the first plurality of RFID tags;
      receiving a second signal from the second RFID reader relating to a most recently read RFID tag from the second plurality of RFID tags;
      determining a position of an inboard side of the movable control surface based on the first signal;
      determining a position of an outboard side of the movable control surface based on the second signal; and,
      comparing the position of the inboard side of the movable control surface to the position of the outboard side of the movable control surface to determine a skew level;
    a first plurality of RFID tags arranged on one of an inboard and outboard side of the movable control surface, wherein each RFID tag from the first plurality of RFID tags is associated with a pre-determined position of the movable control surface;
    a second plurality of RFID tags arranged on the other of the inboard and outboard side of the movable control surface, wherein each RFID tag from the second plurality of RFID tags is associated with a pre-determined position of the movable control surface;
    a first RFID reader in communication with the controller and configured to be moved relative to the RFID tags from the first plurality of RFID tags; and,
    a second RFID reader in communication with the controller and configured to be moved relative to the RFID tags from the second plurality of RFID tags.

11. The system of claim 10, wherein the first and second signals correspond to an identity of the detected RFID tags, and wherein the controller is further configured to:
    compare the first signal with a database comprising each RFID tag and the pre-determined position of that RFID tag; and,
    compare the second signal with the database comprising each RFID tag and the pre-determined position of that RFID tag.

12. The system of claim 10, wherein the first signal comprises a position of the detected RFID tag from the first plurality of RFID tags and wherein the second signal comprises a position of the detected RFID tag from the second plurality of RFID tags.

13. The system of claim 10, wherein the controller is further configured to:
    compare the skew level to a first skew threshold; and
    when the skew level is beyond the first skew threshold, raise an alert associated with the first skew threshold.

14. The system of claim 13, wherein the controller is further configured to:

compare the skew level to a second skew threshold; and
when the skew level is beyond the second skew threshold, inhibit movement of the movable control surface.

\* \* \* \* \*